United States Patent [19]

Popek et al.

[11] Patent Number: 4,675,872
[45] Date of Patent: Jun. 23, 1987

[54] DRIVER UNIT FOR A LASER Q-SWITCH

[75] Inventors: Marc H. Popek, Indian Harbour Beach; Kenneth D. Springer, Indialantic, both of Fla.

[73] Assignee: Harris Corporation, Melbourne, Fla.

[21] Appl. No.: 781,591

[22] Filed: Sep. 30, 1985

[51] Int. Cl.[4] .............................................. H01S 3/11
[52] U.S. Cl. ........................................ 372/10; 372/25
[58] Field of Search .................................. 372/10–12, 372/25

[56] References Cited

U.S. PATENT DOCUMENTS 3,673,504  6/1972  Hilberg ................................ 372/10
3,747,019  7/1973  Koechner et al. .................... 372/10

OTHER PUBLICATIONS

Glass; Wavelength Scaling of Laser Plasma Interactions and Factors Influencing the Choice of a Laser Fusion Driver.

Primary Examiner—Leon Scott, Jr.
Attorney, Agent, or Firm—John L. DeAngelis, Jr.

[57] ABSTRACT

A Q-switch driver for controlling laser output pulses, so that the laser output pulses are of an approximately equal amplitude. Sequences of light request pulses, each such light request pulse for causing the laser to produce a laser output pulse, are input to the Q-switch driver. The Q-switch is controlled by an RF oscillating signal produced by the Q-switch driver such that when the RF signal is present there is no output signal from the laser, and when the RF signal is zero a laser output pulse is produced. If the time between sequences of light request pulses is greater than a predetermined value, the RF signal from the Q-switch driver is modified by leaving the RF partially on so that there is some Q-spoiling present. The amount of RF produced during each light request pulse is gradually diminished exponentially over a predetermined time so that eventually the RF goes to zero during each light request pulse. Modifying the RF produced by the Q-switch driver prevents the generation of a giant first pulse by the laser.

16 Claims, 3 Drawing Figures

DRIVER UNIT FOR A LASER Q-SWITCH

FIELD OF THE INVENTION

This invention relates to a driver unit for a laser Q-switch for reducing the energy in the first laser output pulse in a pulsed or Q-switched laser so that an approximately equal amount of light energy is contained in each laser pulse.

BACKGROUND OF THE INVENTION

The principle of laser operation is stimulated emission of energy. When an electron is in an upper (i.e., excited) energy level of the laser material and a lightwave of precisely the wavelength corresponding to the energy level difference between the unexcited and excited states strikes the electron, the light stimulates the electron to move down to the lower level and emit a photon. This photon is emitted in precisely the same direction and phase with that of the incident photon. Thus a light wave is established in the laser material, and if it can be made to travel back and forth through the laser material it will retain its frequency and grow in amplitude as it stimulates photon emissions. This positive feedback mechanism is accomplished by a mirror placed at each end of the lasing material to reflect the traveling wave back through the laser material. The rear mirror is fully reflecting, and the front mirror is partially reflecting and partially transmitting at the laser wavelength. Light reflected back and forth from the front and rear mirrors serves as positive feedback to sustain oscillation, and the light transmitted through the front mirror is the laser output light. The two mirrors are parallel and form an optical cavity that can be tuned by varying the spacing between them. The laser can operate only at those wavelengths for which a standing-wave pattern can be set up in the cavity, i.e., for which the length of the cavity is an integral number of half wavelengths.

At room temperature, the electron ground state is almost entirely occupied and the upper energy levels are essentially unoccupied. When the upper energy level has a greater electron population than the lower level, a population inversion exists. This inverted population can support lasing since a traveling wave of the proper frequency stimulates downward transitions of the electrons with the associated energy release. The process of exciting the laser material to raise the electrons to an excited state, i.e., producing a population inversion, is referred to as pumping. Pumping can be accomplished optically with a flash lamp driven at a high frequency, by an electric discharge, by a chemical reaction, or in the case of a semiconductor laser, by injecting electrons into the upper energy level with an electric current. When a sufficient number of electrons are in an excited state, the laser energy can be released by allowing the traveling wave to exit the laser cavity.

In a typical YAG laser the laser material comprises yttrium, aluminum, and garnet surrounded by a helical flash lamp. The front and rear mirrors are spaced apart from the laser material on the same longitudinal axis. The flash lamp is driven on and off to excite the electrons in the laser material, moving them to a higher energy level. The typical output of an optical laser consists of a series of spikes occurring during the time the laser is pumped. Spikes are created because the inverted population is being alternatively built up and depleted.

Q-switching (Q-spoiling) is a laser control technique for obtaining all the energy in a single spike of very high peak power or spreading the energy over a series of laser output pulses. As an example of the former, a typical laser generates approximately 100 mJ over an interval of 100 microseconds for an average peak power of 1,000 W. The same laser can be Q-switched to emit 80 mJ in a single 10 nanosecond pulse for peak power of 8 MW. Prior art Q-switching is accomplished by alternately completely inhibiting and allowing a laser output signal. As a simple example, the Q-switch could be a mechanical shutter between the laser material and the front mirror. While the shutter is open, a laser output signal is produced. While the shutter is closed the pumping process continues, but no laser light is emitted from the front mirror. When the shutter is closed for a relatively long time and then opened, a giant laser pulse is emitted. Further opening and closing of the shutter then produces a series of lower-power (relative to the first pulse) laser output pulses. The shutter can be driven by light request pulses, wherein each light-request pulse opens the shutter, allowing laser light to escape, but the shutter has obvious speed/frequency limitations due to its mechanical nature. As the laser pumping frequency increases, the amount of energy in the first pulse also increases, relative to the steady-state laser pulse energy.

A high-peak-power pulse from a Q-switched laser is useful in optical ranging and communications and in producing nonlinear effects in materials. The series of output pulses from a Q-switched laser are useful in material heating and material removal, i.e., material scribing where a first material is deposited over a second material and each laser pulse etches away a small portion of the first material (scribes it) to produce a predetermined pattern on the second material.

One popular type of Q-switch is an acousto-optic version. In this version a transducer constructed of lithium niobate is mounted on acousto-optic material. The transducer is driven by an RF signal that creates a grating pattern in the acousto-optic material. Laser light also impinges on the acousto-optic material such that it is perpendicular to the direction of the acoustic wave (created by the RF signal) through the acoustic-optic material. The spacing of the grating pattern depends on the frequency of the RF signal, and when the spacing reaches a certain minimum, the laser light will be deflected by the grating pattern and not passed through the acousto-optic material. Thus there is a certain minimum RF frequency that must be used to cut-off or spoil the laser output signal. Pulses, typically referred to as light-request pulses, are provided as an input to a driver stage that controls the acousto-optic Q-switch. The pulses modulate an internally generated RF signal. During each request pulse the RF signal goes to zero, thus the grating pattern disappears and an output signal is emitted by the laser. Between light-request pulses, when the modulated RF signal attains its normal peak-to-peak amplitude, the Q-switch is activated and there is no output signal from the laser.

In prior art acousto-optic Q-switches the driver stage responds to the request pulses by bringing the RF signal to zero during each request pulse and allowing the RF signal to attain its normal peak-to-peak amplitude between request pulses. As discussed above, this on/off control scheme creates a giant first laser output pulse when the laser has not produced an output signal for a relatively long time. This "off" time is relative with respect to the frequency of laser operation. When the Q-switched laser is to be used in its pulsed mode (where each pulse does some useful work, for instance in material scribing or heating as discussed above) the giant first pulse must be prevented from reaching the working material to avoid damaging it. Further, increasing the laser frequency to increase the efficiency of the operation is counterproductive because as the laser frequency increases the ratio of first pulse energy compared to the steady-state energy also increases. As the frequency increases and additional energy is contained in the first pulse, there may also be insufficient energy in the succeeding pulses to perform useful work. (Laser frequency is increased by increasing the amount of energy that is input to the laser to create the population inversion.)

Other types of Q-switches are well known in the art including an electro-optic Q-switch, a magneto-optic Q-switch, and a saturable organic-dye absorber Q-switch. The disadvantages associated with the production of a giant first pulse are associated with each of these Q-switch types.

Thus, it would be advantageous to limit the energy contained in the first laser pulse so that it is approximately the same as the energy in succeeding laser pulses. Accomplishing this objective also allows laser operation at a higher frequency to provide more efficient use of the laser in material heating, material scribing, or any of the other uses associated with a pulsed laser.

SUMMARY OF THE INVENTION

A typical acousto-optic Q-switch is driven by equal amplitude request pulses such that during each request pulse the modulated RF signal is zero, and between request pulses the modulated RF signal maintains a constant peak-to-peak amplitude. When the modulated RF signal is zero the Q-switch is deactivated, allowing laser light to exit from the front mirror of the laser. As discussed above, when the Q-spoiling has been activated (no laser output signal) for a relatively long time and a pulse is received to deactivate the Q-spoiling, the first laser output pulse has a large amount of energy.

According to the principles of the present invention as applied to acousto-optic Q-switches, the modulated RF signal for controlling the Q-switch is modified in a Q-switch driver before being provided as an input to the Q-switch. The modification involves retaining some Q-spoiling during the first several request pulses after there has been a relatively long period of Q-spoiling. The amount of Q-spoiling retained decreases exponentially. This novel technique spreads the built-up energy from population inversions over a number of laser cycles, thus eliminating the large first pulse. By thus properly comprehending the natural physics of the laser light, and modulating the RF signal accordingly, the first laser output pulse does not contain excessive energy, but rather has an energy content approximately equal to the succeeding laser pulses. This modification occurs only when there has been no laser output for a relatively long time (dependent on the frequency of laser operation) and then only during the initial several request pulses, to compensate for the buildup of laser energy while there has been no laser output signal.

BRIEF DESCRIPTION OF THE DRAWINGS

The present invention may be better understood, and the further advantages and uses thereof more readily apparent, when considered in view of the following detailed description of exemplary embodiments, taken with the accompanying drawings in which.

DESCRIPTION OF THE PREFERRED EMBODIMENTS

Figure 1:
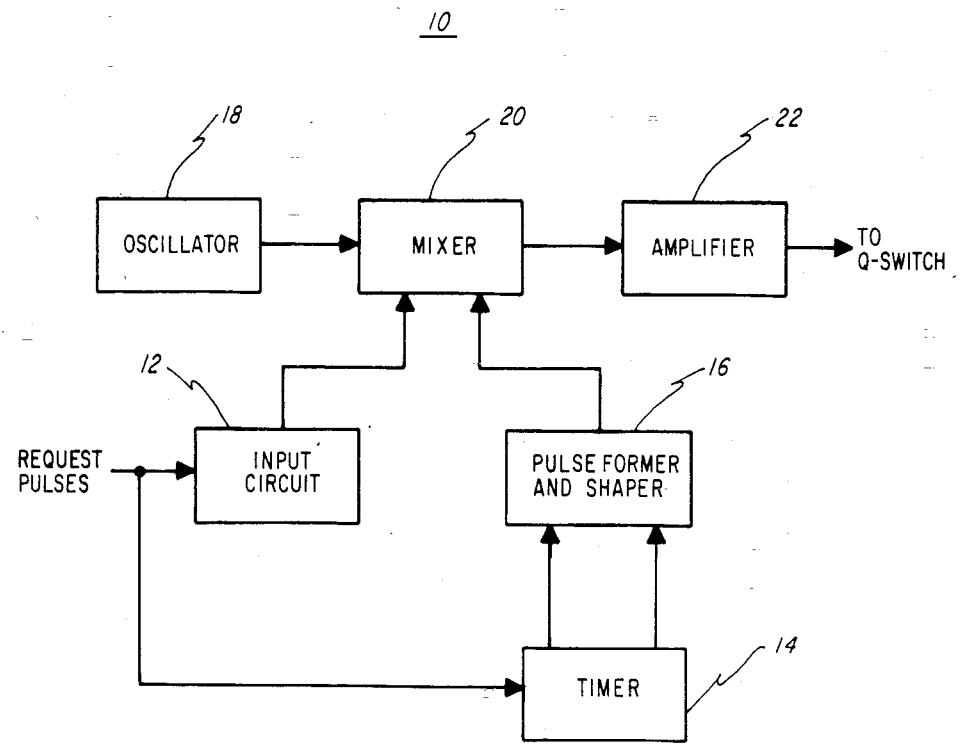
FIG. 1 is a block diagram of a Q-switch driver constructed according to the teachings of the present invention.

FIG. 1 illustrates a Q-switch driver 10, constructed according to the teachings of the present invention, in block diagram form. The Q-switch driver 10 provides a control signal to an acousto-optic Q-switch not shown in FIG. 1. Request pulses are provided as an input to an input circuit 12 and a timer 14. The request pulses, produced by a pulse generator not considered to be a part of the present invention, request deactivation of the Q-switch so that the laser (not shown in FIG. 1) will produce an output light pulse. That is, the request pulses are used by the Q-switch driver 10 to produce a control signal for controlling the Q-switch and thus the laser output. According to the principles of the present invention, the control signal operates the Q-switch such that the laser output pulses have approximately the same average power content and the giant first pulse produced by prior art Q-switches is absent.

Returning to FIG. 1, the timer 14 provides two signals to a pulse former and shaper 16. A mixer 20 is responsive to signals from the input circuit 12 and the pulse former and shaper 16. The mixer 20 mixes an RF signal from an oscillator 18 with either a constant amplitude signal from the input circuit 12 or an exponentially decaying signal from the pulse former and shaper 16 to produce a modulated RF signal. The output signal from the mixer 20 comprises the control signal, which is then amplified by an amplifier 22. The control signal drives the Q-switch for controlling the laser output pulses.

Figure 2:
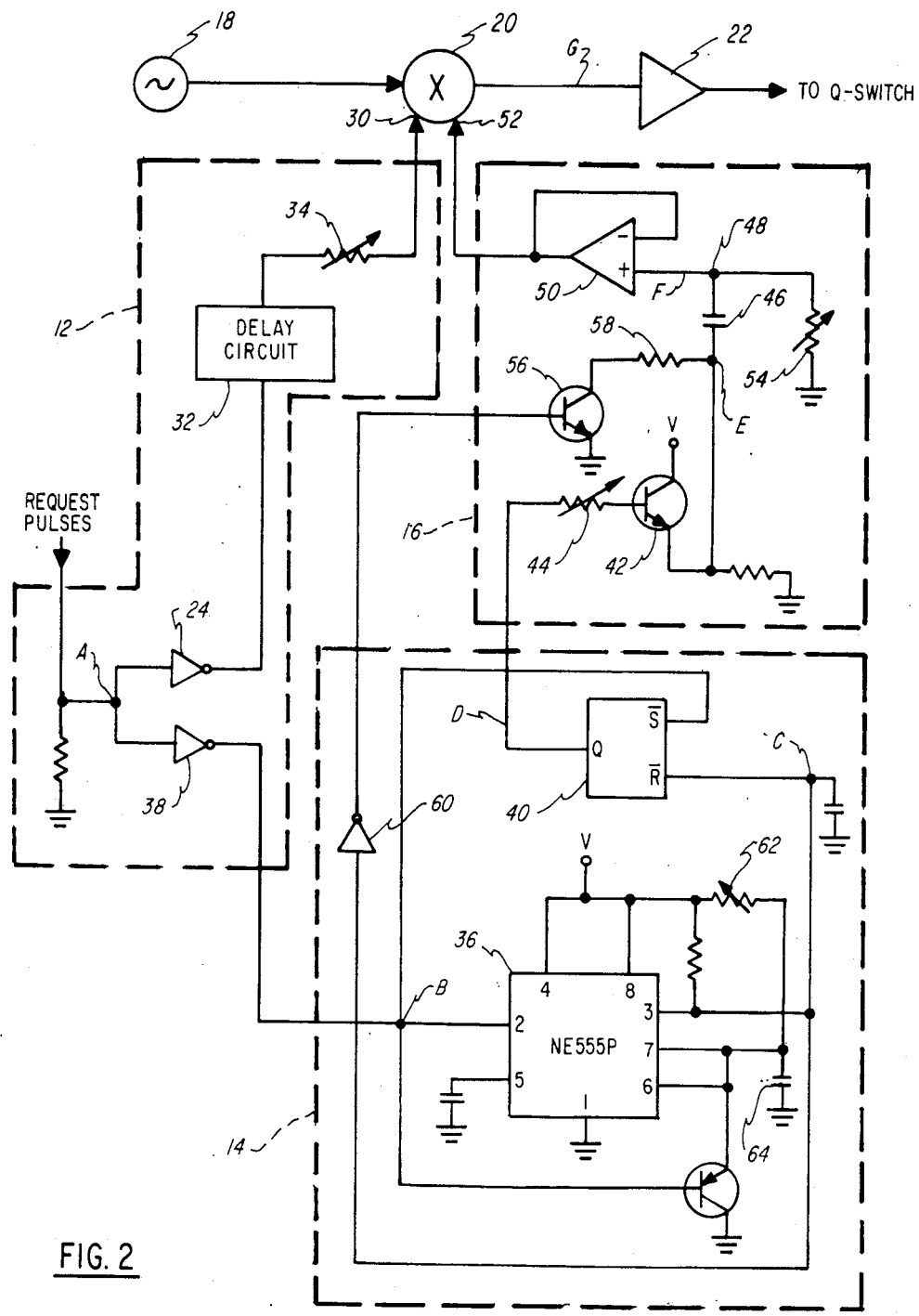
FIG. 2 is a schematic diagram of the Q-switch driver illustrated in FIG. 1.

FIG. 2 illustrates a preferred embodiment for the Q-switch driver 10. When no request pulses are present, the high signal on the output terminal of an inverting gate 24 is provided as an input to the mixer 20 at a terminal 30 thereof, via a delay circuit 32 and a potentiometer 34. The signals at the terminals 30 and 52 of the mixer 20 are modulating signals for modulating the RF signal from the oscillator 18. The high signal at the terminal 30 mixes with the RF signal; the resulting modulated signal is an RF signal within a constant envelope as determined by the signal at the terminal 30. The modulated signal is applied to an input terminal of an amplifier 22 to produce an amplified signal. The amplitude of the amplified signal (determined by the envelope) is sufficient to turn on the Q-switch, and no laser output energy is produced.

Figure 3:
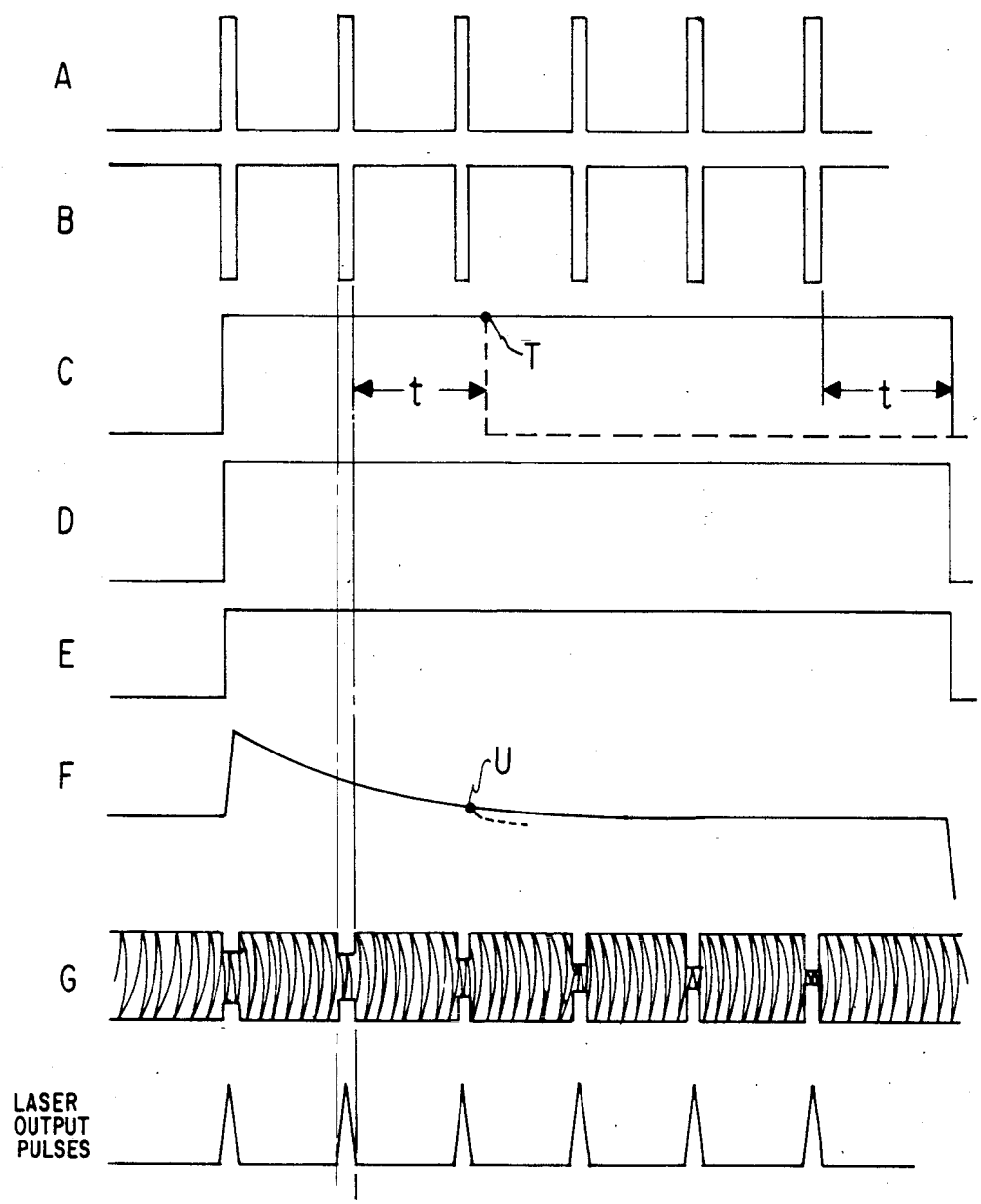
FIG. 3 is a signal diagram illustrating the signal at various locations in the schematic diagram of FIG. 2.

In response to the first request pulse in a sequence of request pulses the RF signal is modulated to turn the Q-switch off, allowing the production of laser energy pulses. Typically, the request pulses are in the form of low-to-high pulses of approximately six microseconds duration. In FIG. 3 the request pulses are designated as waveform A, corresponding to the signal at the location designated by A in FIG. 2. During the first request pulse, the inverting gate 24 turns off the modulating signal at the terminal 30 of the mixer 20, and the envelope of the modulated signal collapses to zero. At the same time, the inverting gate 24 produces a high-to-low transition that triggers the timer 36. The timer 36 is one element within the timer 14. The output signal from a terminal 3 of the timer 36 remains in a high state as long as the next request pulse reaches the timer 36 before the "time-out" time thereof. In the preferred embodiment, the timer 36 is the popular integrated circuit 555 timer. Inverted request pulses from an inverting gate 38 are applied to the $\bar{S}$ input terminal of a flip-flop 40. The $\bar{R}$ input terminal of the flip-flop 40 is responsive to the output signal from the terminal 3 of the timer 36. Both input signals to the flip-flop 40 are illustrated in FIG. 3, designated signals B (the $\bar{S}$ input signal) and C (the $\bar{R}$ input signal). The "time-out" time for the timer 36 is shown in FIG. 3, designated with a "t". The output signal (Q) from the flip-flop 40 (waveform D) stays high until the $\bar{R}$ input terminal (waveform C) goes low again, triggering a reset.

The output signal from the flip-flop 40 is provided as an input to the base terminal of a transistor 42 via a potentiometer 44. When the transistor 42 conducts a step voltage is provided to a capacitor 46. The potentiometer 44 controls the base drive level for turning on the transistor 42. In turn, the base drive level determines the magnitude of the step voltage provided to the capacitor 46. Because the voltage across the capacitor 46 cannot change instantaneously, the terminal 48 also sees the voltage step. The terminal 48 is connected to the non-inverting input terminal of an operational amplifier 50; the signal at the terminal 48 is illustrated in FIG. 3 as waveform F. The operational amplifier 50 is a high slew-rate operational amplifier operating in the unity-gain mode as a buffer/driver and providing a signal to the terminal 52 of the mixer 20. The signal at the terminal 52 mixes with the RF signal so that while the signal at the terminal 30 is zero (during request pulses) the modulated signal amplitude is determined by the signal at the terminal 52. After the request pulse, the modulated signal amplitude rises to the constant envelope value again. See waveform G of FIG. 3. During the next request pulse the signal at the terminal 52 again mixes with the RF signal, but now the amplitude at the terminal 52 has decreased exponentially from the value during the first request pulse. The signal on the terminal 52 eventually decays to zero as the voltage at the terminal 54 (waveform F) is drained through the potentiometer 54. The potentiometer 54 establishes the decay constant for the capacitor 46 and thus the decay rate of the exponentially decaying signal at the terminal 52.

The output signal from the mixer 20 is illustrated as waveform G in FIG. 3. The laser produces no output pulses when the waveform G signal is oscillating between the peak values of the envelope. Laser output pulses are produced only when there is a step voltage change in the RF envelope of waveform G; the laser output pulses are illustrated at the bottom of FIG. 3. During a sequence of request pulses, the RF signal from the mixer 20 is gradually reduced to zero, in an exponentially decaying fashion, during each request pulse. See waveform G. In the time between request pulses, the drive applied to terminal 30 of the mixer 20 is sufficient to saturate the mixer and permit an RF signal to appear at the output terminal of the mixer 20, thus turning off the laser. After the waveform F signal (terminal 48) has decayed to zero, the modulated signal has approximately a zero value during subsequent request pulses.

Because the RF is partially "on" during the first few request pulses of any sequence, the Q-switch 10 remains partially on allowing only some of the laser light to escape. This action prevents the laser from providing a giant first light pulse when the Q-switch has been off for a relatively long time before the first of a sequence of request pulses appears at the input circuit 12. In contrast, the prior art drivers for acousto-optic Q-switches allow the Q-switch to be completely "off" during request pulses, and completely "on" between request pulses.

Returning to FIG. 2 a transistor 56 provides rapid discharge (to ground via a resistor 58) of the voltage across the capacitor 46 when the "time-out" time of the timer 36 has elapsed after the last request pulse. To prevent a giant first pulse and to ensure reactivation of the Q-switch driver 10, the "time-out" time equals the time it would otherwise take for the laser to build up a giant first pulse, when controlled by a Q-switch without the features of the present invention. Also, after the "time-out" time has elapsed the flip flop 40 is reset by the high-to-low transition at the R input terminal thereof, and the Q-switch driver 10 is ready for another series of request pulses.

The operation of this discharge feature is illustrated in FIG. 3. t is the "time-out" time of the timer 36; if a request pulse is not received within t seconds of the previous request pulse, the timer 36 output signal (waveform C) goes low. Assuming only two request pulses are received by the Q-switch driver 10, the "time-out" time of the timer 36 ends at a point designated T on the waveform C of FIG. 3, thus the output signal of the timer 36 goes low at the point T (illustrated by the dashed line in FIG. 3). The transistor 56 is then forward biased, via an inverting gate 60, and the capacitor 46 discharges to ground via the resistor 58 and the collector-emitter junction of the transistor 56. This is illustrated by the dashed line, beginning at a point U, on the waveform F of FIG. 3. The timer 36 also "times-out" after the last request pulse in the series illustrated in FIG. 3. The time constant determined by the potentiometer 62 and the capacitor 64 establishes the "time-out" time t for the timer 36.

The delay circuit 32 is necessary to delay the low-level signal from the inverting gate 24 until the timer 14 and the pulse former and shaper 16 have had sufficient time to generate the decaying exponential signal at the terminal 52. The potentiometer 34 controls the constant envelope amplitude of the modulated signal from the mixer 20.

The Q-switch driver 10 provides flexibility in choosing the amplitude of the first laser output pulse (controlled by the potentiometer 44), the decay rate (controlled by the potentiometer 54), and the "time-out" time of the timer 36 (controlled by the potentiometer 62). These characteristics are chosen to suit a particular laser and application.

In summary, there has been disclosed a Q-switch driver for eliminating the giant first pulse typically associated with pulsed laser output signals. When used with an acousto-optic Q-switch, elimination of the giant first pulse is accomplished by modulating the RF signal with an exponentially decaying envelope during the first several request pulses in a sequence so that the Q-switch is partially on during the first few request pulses.

As will be appreciated by those skilled in the art, the technique taught by the present invention is applicable to any type of Q-switch. During the first few request pulses some Q-spoiling must be provided. Ideally, the amount of this Q-spoiling should be decreased exponentially, at a rate determined by the laser and application so that after the first few request pulses the Q-spoiling is terminated. When there has not been a laser output signal for a relatively long time (again determined by the laser's characteristics and application) the Q-spoiling retention during the first few request pulses should be started again.

What is claimed:

1. A driver unit for controlling a laser Q-switch such that laser output pulses have an approximately equal amplitude, wherein when there have not been laser output pulses for a predetermined time said driver unit provides a predetermined amount of adjustable Q-spoiling.

2. The driver unit of claim 1 wherein the Q-spoiling decreases exponentially with each laser output pulse, and is provided for a predetermined time.

3. The driver unit of claim 2 wherein the rate of exponential decrease of the Q-spoiling is adjustable.

4. The driver unit means of claim 1 wherein the predetermined time during which there have been no laser output pulses is adjustable.

5. A driver unit means for controlling a laser Q-switch such that laser output pulses have an approximately equal amplitude, means for providing a light request pulse when a laser output pulse is required, wherein each light-request pulse is provided as an input to said driver unit means, and when the laser has not produced a laser output pulse for a predetermined time, said driver unit means provides a predetermined amount of adjustable Q-spoiling for a predetermined time.

6. The driver unit of claim 5 wherein the amount of Q-spoiling decreases exponentially with each laser output pulse.

7. The driver unit of claim 6 wherein the rate of exponential decrease of the Q-spoiling is adjustable.

8. The driver unit means of claim 5 wherein the predetermined time during which there have been no laser output pulses is adjustable.

9. A driver unit means for controlling an acousto-optic laser Q-switch, comprising:
means for providing light-request pulses when a laser output pulse is required, means for producing a control signal in response to said light-request pulses and for determining the time since a last light-request pulse;
means for providing an RF signal; and
means for producing a modified RF signal in response to said control and RF signals wherein said modified RF signal has a substantially constant amplitude between light-request pulses, and when there has not been a light-request pulse for a predetermined time said modified signal has an exponentially decaying envelope during successive light-request pulses; and
wherein said modified RF signal is applied to the acousto-optic laser Q-switch such that the laser output pulses are of approximately equal amplitude.

10. The driver unit means of claim 9 wherein the rate of exponential decay is adjustable.

11. The driver unit means of claim 9 wherein the initial valve of the exponentially decaying envelope is adjustable.

12. The driver unit means of claim 9 wherein the predetermined time during which there have been no laser output pulses is adjustable.

13. A driver unit means for controlling a laser Q-switch comprising means for producing laser output pulses having an approximately equal amplitude, and when not driving the Q-switch for a predetermined time means for providing a predetermined amount of adjustable Q-spoiling.

14. The driver unit means of claim 13 wherein the amount of Q-spoiling decreases exponentially with each laser output pulse.

15. The driver unit means of claim 13 wherein the rate of exponential decrease of the Q-spoiling is adjustable.

16. The driver unit means of claim 13 wherein the predetermined time during which there have been no laser output pulses is adjustable.

* * * * *